United States Patent
Murray et al.

(10) Patent No.: US 12,541,420 B2
(45) Date of Patent: Feb. 3, 2026

(54) STORING DEVICE HEALTH DATA IN PERSISTENT STORAGE

(71) Applicant: HEWLETT PACKARD ENTERPRISE DEVELOPMENT LP, Spring, TX (US)

(72) Inventors: Christopher S. Murray, Boynton Beach, FL (US); Dennis R. LaCroix, Plano, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/753,093

(22) Filed: Jun. 25, 2024

(65) Prior Publication Data
US 2025/0390373 A1 Dec. 25, 2025

(51) Int. Cl.
*G06F 11/07* (2006.01)
*G06F 11/30* (2006.01)

(52) U.S. Cl.
CPC ........ *G06F 11/079* (2013.01); *G06F 11/0709* (2013.01); *G06F 11/0787* (2013.01); *G06F 11/0793* (2013.01); *G06F 11/3006* (2013.01)

(58) Field of Classification Search
CPC ............. G06F 11/3006; G06F 11/3466; G06F 11/0751; G06F 3/0653; G06F 3/0787
See application file for complete search history.

(56) References Cited

U.S. PATENT DOCUMENTS

| | | |
|---|---|---|
| 3,801,963 A | 4/1974 | Chen |
| 7,085,884 B2 | 8/2006 | Torrey et al. |
| 7,392,424 B2 | 6/2008 | Ho et al. |
| 8,009,499 B2 | 8/2011 | Reuter et al. |
| 8,453,015 B2 | 5/2013 | Ponnuswamy |
| 9,524,173 B2 | 12/2016 | Guntaka et al. |
| 9,800,481 B1 * | 10/2017 | Borlick ............ H04L 43/10 |
| 10,015,113 B2 | 7/2018 | Yeung et al. |
| 10,452,503 B2 | 10/2019 | Abouelwafa et al. |
| 10,459,657 B2 | 10/2019 | Maheshwari et al. |
| 10,642,674 B2 | 5/2020 | Oota |
| 10,684,954 B2 | 6/2020 | Voigt et al. |
| 10,983,880 B2 | 4/2021 | Gupta et al. |
| 11,403,319 B2 | 8/2022 | Demmon et al. |
| 2012/0278652 A1 | 11/2012 | Dawkins et al. |

(Continued)

OTHER PUBLICATIONS

Brett Verney, "Aruba AOS8 Mobility Conductor Redundancy," Mar. 22, 2022, <https://wifiwizardofoz.com/aruba-os8-mobility-conductor-redundancy/>, 10 Pages.

(Continued)

*Primary Examiner* — Yolanda L Wilson
(74) *Attorney, Agent, or Firm* — Trop, Pruner & Hu, P.C.

(57) ABSTRACT

Example implementations relate to computer data storage. In some examples, a controller of a first device receives a first data file comprising operating health information for a second device. The controller of the first device stores the first data file in a memory of the first device, and determines whether the second device is in operating normally. Further, in response to a determination that the second device is not operating normally, the controller of the first device moves the first data file from the memory of the first device to a persistent storage of the first device.

20 Claims, 9 Drawing Sheets

(56) References Cited

U.S. PATENT DOCUMENTS

| | | | |
|---|---|---|---|
| 2015/0269043 A1* | 9/2015 | Wilson | G06F 11/3006 |
| | | | 714/6.3 |
| 2016/0062835 A1* | 3/2016 | Kozawa | G06F 11/3466 |
| | | | 714/764 |
| 2016/0077752 A1 | 3/2016 | Vanninen | |
| 2018/0276092 A1 | 9/2018 | Nelson et al. | |
| 2020/0210261 A1* | 7/2020 | Reddy | H04L 41/0853 |
| 2021/0034441 A1* | 2/2021 | Wu | G06F 21/6218 |

OTHER PUBLICATIONS

Hewlett Packard Enterprise Development Lp, "HPE 3PAR StoreServ Architecture," Jul. 2017, Technical White Paper, 4AA3-3516ENW, Rev. 9, 39 pages.

\* cited by examiner

STORING DEVICE HEALTH DATA IN PERSISTENT STORAGE

BACKGROUND

Some computing systems may include a group of computing devices, or "nodes" herein, that are coupled via a communication medium (e.g., a network). In some examples, each computing device may include hardware components (e.g., a processor, memory, storage device, and so forth) and software components.

BRIEF DESCRIPTION OF THE DRAWINGS

Some implementations are described with respect to the following figures.

Figure 1:
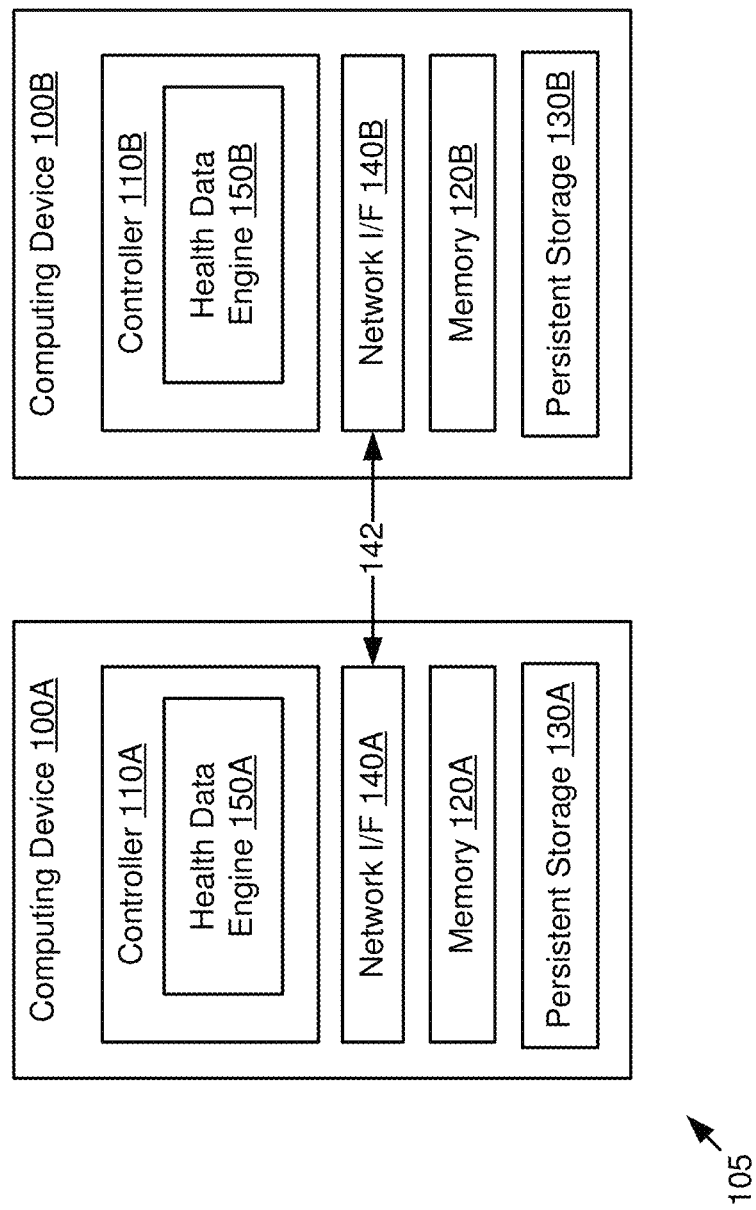
FIG. 1 is a schematic diagram of an example system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a computing system may include multiple computing devices coupled via network links. For example, a modular enclosure or system may include multiple computing modules (e.g., blade servers) that each include hardware processor(s), memory (e.g., volatile memory devices), persistent storage (e.g., non-volatile memory devices), network interface(s), and so forth. The server enclosure may be included in a larger system providing computing services (e.g., a datacenter, a cluster, and so forth).

In some examples, each computing device may periodically generate a file including information (also referred to herein as "health data") that indicates the operating state of the computing device for a given point (or period) in time. For example, each health data file may include one or more of processor metrics, memory metrics, storage usage, listing of active processes, event log, error log, diagnostic messages, power metrics, temperature level, network bandwidth, storage fragmentation, cache metrics, and so forth. In some examples, each health data file may be persistently stored (e.g., in non-volatile memory) so it is not lost in the event of a system shut-down. Subsequently, in the event of an unexpected system shut-down (e.g., a system crash), the stored health data file may be accessed (e.g., from non-volatile memory) and analyzed to diagnose the cause for the system shut-down.

However, in some examples, storing each generated health data file in non-volatile memory (e.g., for possible use in diagnosing a later system crash) may reduce the functionality and/or reliability of the computing device. For example, the non-volatile memory may only be capable of receiving a limited number of data writes (due to physical degradation of the memory circuits). As such, writing each health data file (that is generated periodically) to the non-volatile memory may consume a significant portion of the available number of writes, and may therefore reduce the usable life of the non-volatile memory.

In accordance with some implementations of the present disclosure, a first computing device may be coupled to a second computing device via a network link. The second computing device may generate a health data file (e.g., indicating the operating state of the second computing device), and may send the health data file to a directory in volatile memory of the first computing device. The first computing device may detect the presence of the health data file in the volatile memory, and may analyze the health data file to determine the state of the second computing device. Upon determining that the second computing device is in an error state, the first computing device may cause a restart of the second computing device. Further, after causing the restart of the second computing device, or upon determining that the second computing device had an unexpected restart (e.g., a system crash, a self-restart due to an error state, etc.), the first computing device may transfer the health data file from the volatile memory to non-volatile memory of the first computing device. In this manner, the health data file is not lost when the second computing device is shut-down. Further, a health data file that is needed for later analysis (e.g., to diagnose a shut-down or error state) is preserved, without requiring the write of each health data file that is periodically generated by the second computing device. Furthermore, the second computing device may perform a similar process to receive and save the health data files that are generated by the first computing device. In this manner, the number of writes of health data files to non-volatile memory (in both the first and second computing devices) may be reduced, and may therefore increase the usable life of the non-volatile memory. Various aspects of the disclosed technique are discussed further below with reference to FIGS. 1-6.

FIG. 1—Example System

FIG. 1 shows an example system 105, in accordance with some implementations. The system 105 may include a first computing device 100A and second computing device 100B. The first computing device 100A may include a controller 110A, a memory device 120A, persistent storage 130A, and a network interface (I/F) 140A. Further, the second computing device 100B may include a controller 110B, a memory device 120B, persistent storage 130B, and a network I/F 140B.

In some implementations, the computing devices 100A, 100B may be associated or paired devices (also referred to herein as "peer devices") that include similar components, and that perform similar functionality. For example, the computing devices 100A, 100B may be embedded devices or processing modules (e.g., server blades) that are hosted or mounted in a host device or enclosure. In some implementations, the computing devices 100A, 100B may use the respective network I/Fs 140A, 140B to communicate via a network link 142.

In some implementations, the controllers 140A, 140B may be implemented via a hardware processing circuit (e.g., a microprocessor, a core of a multi-core microprocessor, a microcontroller, a programmable integrated circuit, a programmable gate array, a digital signal processor, and so forth), or a combination of hardware and programming (e.g., comprising at least one processor and instructions executable by the at least one processor and stored on at least one machine-readable storage medium). The memory devices 120A, 120B may be implemented in volatile memory such as random access memory (RAM). As used herein "volatile" memory may refer to memory that does not retain stored information after electrical power is removed. Further, the persistent storage 130A, 130B may be implemented in non-volatile memory such as flash memory. As used herein "non-volatile" memory may refer to memory that retains stored information even after electrical power is removed.

In some implementations, the controller 140A (in first computing device 110A) may execute or include a first health data engine 150A. Further, the controller 140B (in second computing device 110B) may execute or include a second health data engine 150B. As used herein, an "engine" may refer to machine-readable instructions (e.g., software instructions and/or firmware instructions stored on at least one machine-readable storage medium) executable on a hardware processing circuit. For example, the health data engines 150A, 150B may be implemented as program code that is respectively executed by the controllers 110A, 110B, and is respectively loaded in the memory devices 120A, 120B. Further, in some implementations, the program code for the health data engines 150A, 150B may be respectively stored in the persistent storage 130A, 130B. Alternatively, an "engine" may refer to a hardware processing circuit (e.g., any or some combination of a microprocessor, a core of a multi-core microprocessor, a microcontroller, a programmable integrated circuit, a programmable gate array, a digital signal processor, or another hardware processing circuit), or a combination of a hardware processing circuit and machine-readable instructions.

In some implementations, the first health data engine 150A may include functionality to collect health information that indicates the operating state of the first computing device 110A. The first health data engine 150A may periodically generate data file(s) that includes the collected health information for the first computing device 110A. For example, each health data file may include one or more of processor metrics, memory metrics, storage usage, listing of active processes, event log, error log, diagnostic messages, power metrics, temperature level, network bandwidth, storage fragmentation, cache metrics, and so forth. In some implementations, the first health data engine 150A may transmit or push each generated health data file (for first computing device 110A) to the memory 120B in the second computing device 110B.

Similarly, the second health data engine 150B may collect health information for the second computing device 110B, and may periodically generate health data file(s) that includes the collected health information for the second computing device 110B. Further, the second health data engine 150B may transmit or push each generated health data file (for second computing device 110B) to the memory 120A in the first computing device 110A.

In some implementations, the first health data engine 150A may detect the presence of the health data file (from second computing device 110B) in the memory 120A, and may then analyze the health data file to determine the state of the second computing device 110B. Upon determining that the second computing device 110B is in an error state, the first health data engine 150A may cause a restart of the second computing device 110B. Further, after causing the restart of the second computing device 110B, or upon determining that the second computing device 110B has suffered an unexpected shut-down, the first health data engine 150A may transfer the health data file from the memory 120A to the persistent storage 130A. In this manner, the health data file is not lost when the second computing device 110B is shut-down (e.g., due to an error state or an unexpected crash).

Further, the second health data engine 150B (in second computing device 110B) may provide functionality that is equivalent or similar to that provided by the health data engine 150A (described above). For example, the second health data engine 150B may detect the presence of the health data file (from first computing device 110A) in the memory 120B, and may then analyze the health data file to determine the state of the first computing device 110A. Upon determining that the first computing device 110A is in an error state, the second health data engine 150B may cause a restart of the first computing device 110A. Further, after causing the restart of the first computing device 110A, or upon determining that the first computing device 110A had an unexpected restart, the second health data engine 150B may transfer the health data file from the memory 120B to the persistent storage 130B. In this manner, the health data file is not lost when the first computing device 110A is shut-down.

As described above, the health data engines 150A, 150B may provide a process for persistently storing only those health data files that may be needed for later analysis (e.g., to diagnose a shut-down), without requiring the persistent storage of every health data file that may be generated. In this manner, the number of writes of health data files to the persistent storage 130A, 130B may be reduced, and may therefore increase the usable life of the persistent storage 130A, 130B. An example process performed by the health data engines 150A, 150B is described in greater detail below with reference to FIGS. 2-3B.

Figure 2:
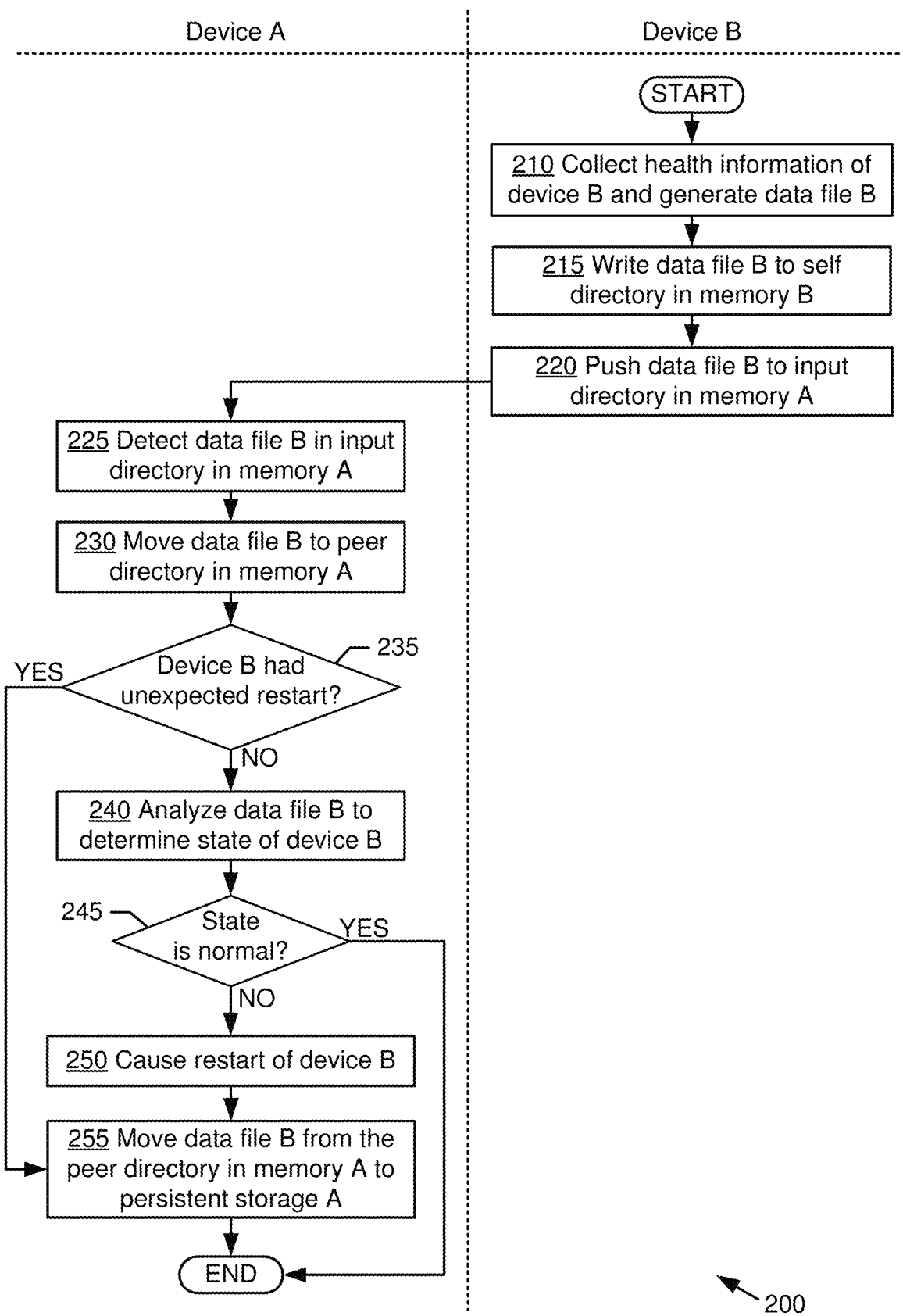
FIG. 2 is an illustration of an example process, in accordance with some implementations.
Figure 3A:
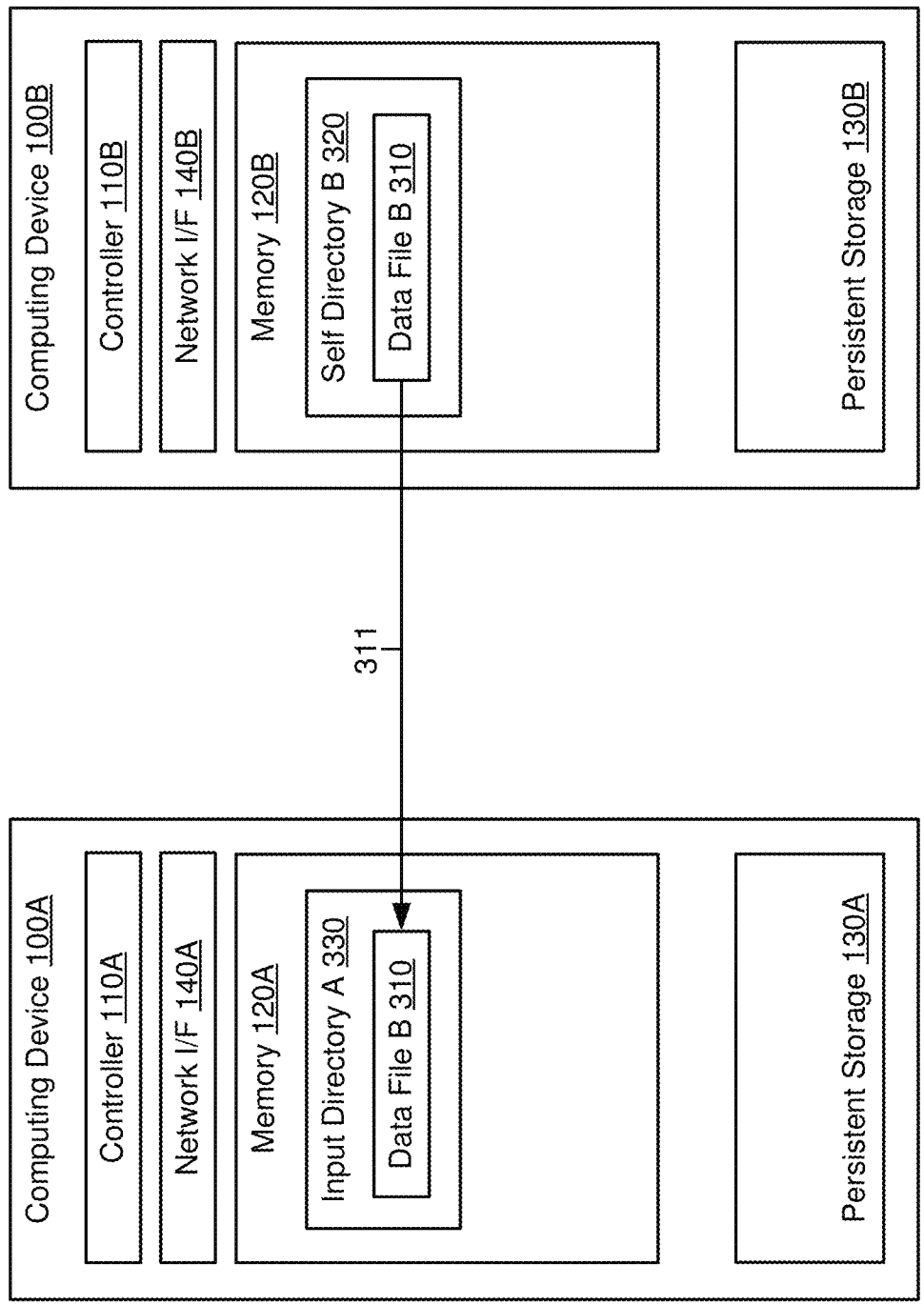
FIGS. 3A-3D are illustration of example operations, in accordance with some implementations.
Figure 3B:
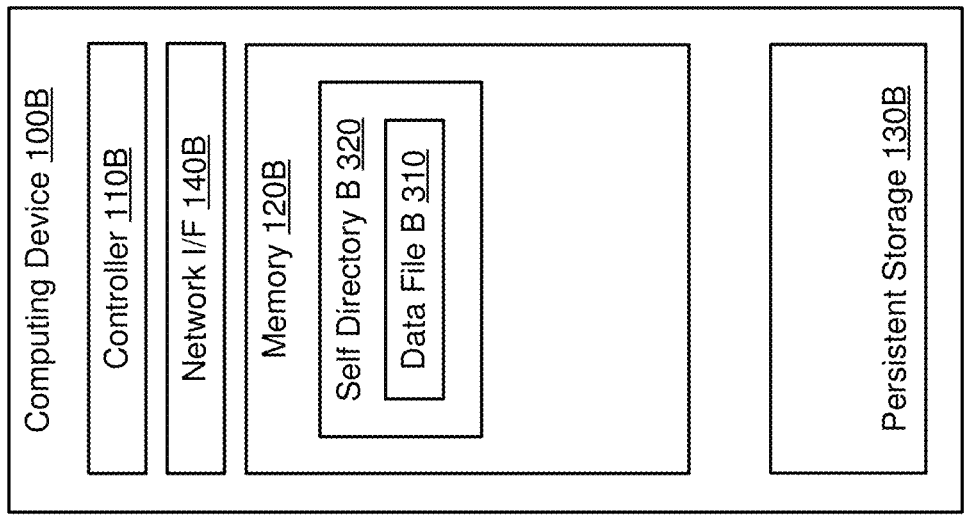
Figure 3B:
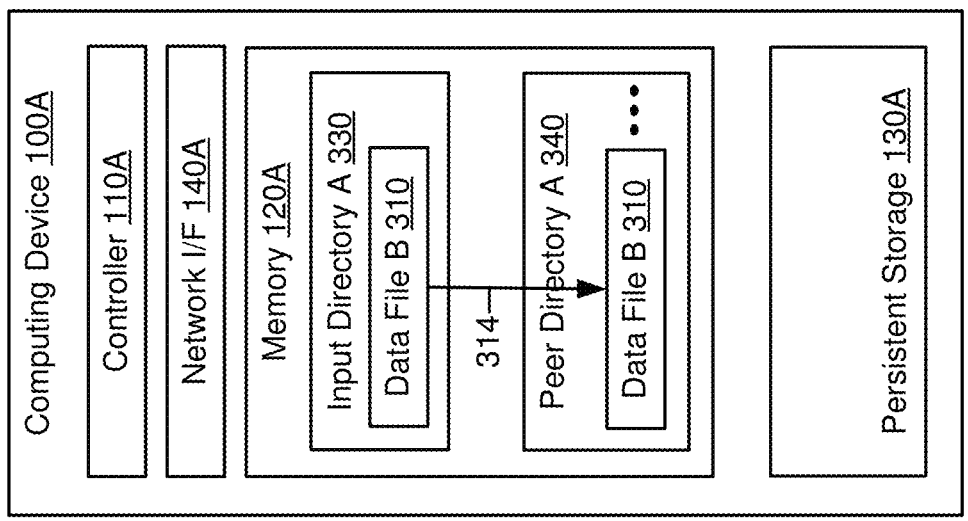

FIGS. 2-3B—Example Process for Storing Health Data

FIG. 2 shows an example process 200 for storing health data, in accordance with some implementations. The process 200 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. As shown in FIG. 2, in some implementations, each action of the process 200 may be performed by one of two peer devices A and B. For the sake of illustration, details of the process 200 may be described below with reference to FIGS. 1 and 3A-3B, which show example implementations. For example, the devices A and B may correspond generally to the first computing device 110A and the second computing device 110B (shown in FIG. 1). However, other implementations are also possible.

Block 210 may include collecting health information of device B and generating a data file B. Block 215 may include writing the data file B to a self directory in the memory B of device B. Block 220 may include sending the data file B to an input directory in the memory A of device A. For example, referring to FIG. 3A, the controller 110B collects health information of a second computing device 100B. The controller 110B generates a data file B 310 that includes some or all of the collected health information. The data file B 310 may be repeatedly generated according to a defined time period (e.g., every two minutes, every five minutes, etc.), a predefined schedule, and so forth. The controller 110B writes the data file B 310 into the self directory B 320 in the memory 120B of the second computing device 100B. The controller 110B then sends or "pushes" 311 the data file B 310 to the input directory A 330 in the memory 120A of a first computing device 100A. In some implementations, an "input directory" may be a portion of volatile memory that is reserved or dedicated for receiving a health data file that is pushed from a peer computing device. Further, in some implementations, the input directory A 330 may not be capable of storing more than one data file at a time.

Referring again to FIG. 2, block 225 may include detecting the data file B in the input directory in the memory A. Block 230 may include moving the data file B from the input directory to a peer directory in the memory A. For example, referring to FIG. 3B, the controller 110A detects that the data file B 310 is loaded in the input directory A 330, and in response moves 314 the data file B 310 from the input directory A 330 to the peer directory A 340. In some implementations, the move 314 to the peer directory A 340 may be performed to prevent the data file B 310 from being overwritten when another data file is received from the second computing device 100B (e.g., upon expiration of a period for sending a new data file). As used herein, a "peer directory" may be a portion of volatile memory that is reserved or dedicated for temporarily storing health data file(s) received from a peer computing device. For example, the Further, in some implementations, the peer directory A 340 may be capable of storing multiple data files at a time (e.g., up to a maximum number). For example, the peer directory A 340 may be limited to storing the M most recently-received data files, where M is a positive integer greater than one.

Referring again to FIG. 2, decision block 235 may include determining whether the device B had an unexpected restart. If it is determined that the device B had an unexpected restart ("YES"), the process 200 may continue at block 255, including moving the data file B from the peer directory in memory A to persistent storage A. After block 255, the process 200 may be completed.

Figure 3C:
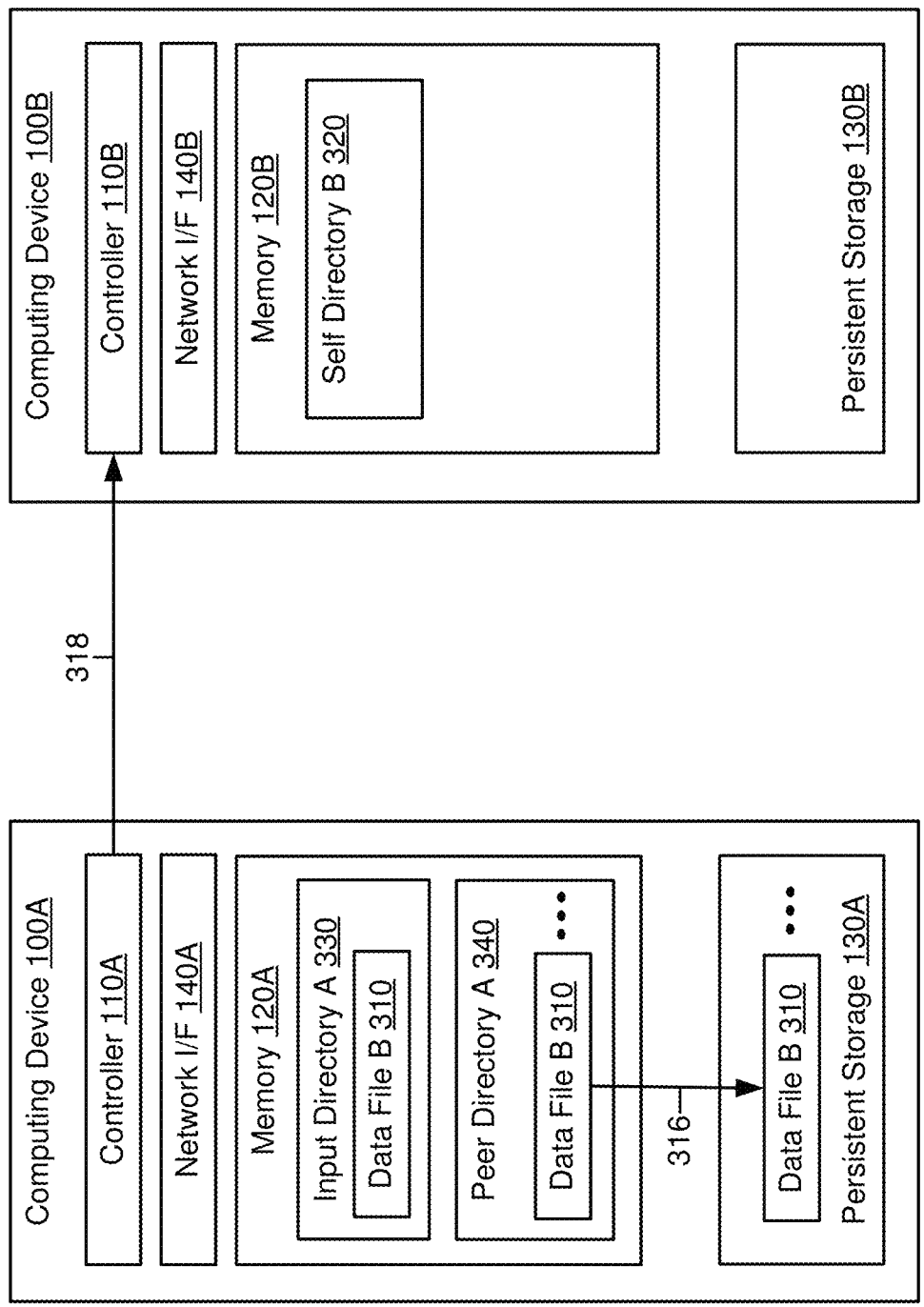

For example, referring to FIG. 3C, after moving the data file B 310 into the peer directory A 340 (e.g., at block 230), the controller 110A sends a query or other message to the second device 100B. Further, upon failing to receive a valid reply from the second device 100B (e.g., within a time-out period), the controller 110A determines that the second device 100B has crashed. In another example, the controller 110A may communicate with the second device 100B via a data channel or bus (e.g., a general-purpose input/output (GPIO) channel), and may receive, from the second device 100B, a message indicating that the second device 100B has restarted itself (e.g., in response to an error state). In response to determining that the second device 100B had an unexpected restart (e.g., has crashed, has restarted itself in response to an error, etc.), the controller 110A moves 316 the data file B 310 from the peer directory A 340 in memory 120A to the persistent storage 130A, thereby preserving the data file B 310 for later analysis. Stated differently, because the controller 110A determines that the second device 100B has crashed (or has restarted itself), and because the data file B 310 includes health data indicating the operation state of the second device 100B as of a recent time that precedes the crash or restart, the data file B 310 is stored in the persistent storage 130A for later use in diagnosing or analyzing the crash (or the error state that caused an unscheduled restart) of the second device B.

Referring again to FIG. 2, if it is determined at decision block 235 that the device B has not had an unexpected restart ("NO"), the process 200 may continue at block 240, including analyzing the data file B to determine the operating state of device B. Decision block 245 may include determining whether device B is in a normal operating state. If so ("YES"), the process 200 may be completed. Otherwise, if it is determined at decision block 245 that device B is not in a normal operating state ("NO"), the process 200 may continue at block 250, including causing a restart of device B. After block 250, the process 200 may continue at block 255, including moving the data file B from the peer directory in memory A to persistent storage A. After block 255, the process 200 may be completed.

For example, referring again to FIG. 3C, the controller 110A analyzes the received data file B 310 (e.g., the most recent data file in the peer directory A 340) to determine the current (or most recent) operating state of the device B. Upon determining (based on the analysis of data file B 310) that the second device 100B is operating in an erroneous or unstable state (e.g., has become frozen, has suffered a serious software or memory error, and so forth), the controller 110A sends a restart command 318 to the controller 110B, thereby causing the second device 100B to restart. In this manner, the controller 110A causes the second device 100B to recover from an erroneous state, even if the second device 100B is disabled (or is otherwise prevented from self-recovery) by its own erroneous state. Further, the controller 110A moves 316 the data file B 310 from the peer directory A 340 in memory 120A to the persistent storage 130A, thereby preserving the data file B 310 for later use in diagnosing or analyzing the erroneous state of the second device B.

In some implementations, the persistent storage 130A may be capable of storing multiple data files at a time. Further, the number of data files that can be stored in the persistent storage 130A may be limited by a maximum number. For example, the persistent storage 130A may be limited to storing the N most recently-received data files, where N is a positive integer greater than one.

Figure 3D:
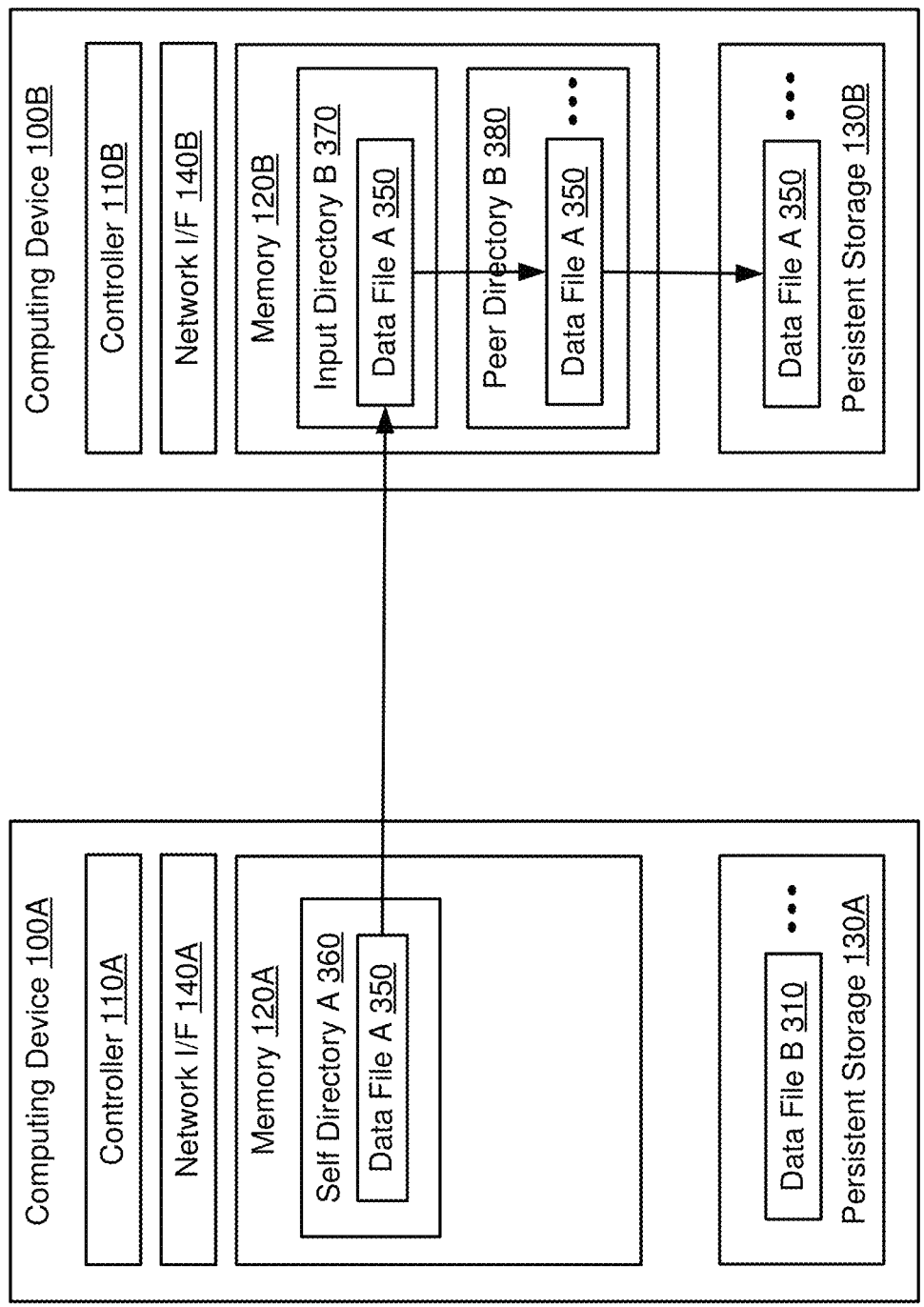

As discussed above, FIGS. 2-3C illustrate an example process 200 in which a first device A receives a data file B from a second device B, and may persistently store the data file B in persistent storage 130A if the second device B has crashed or is not operating normally. In this manner, the number of health data files written to the persistent storage 130A may be reduced, and may therefore increase the usable life of the persistent storage 130A. Further, in some implementations, the process 200 may additionally (or alternatively) be performed by reversing the actions performed by each device. For example, referring now to FIG. 3D, shown is an example operation in which the controller 110A collects health information of the first computing device 100A, generates a data file A 350 based on the collected health information, and sends the data file A 350 to the input directory B 370 in memory 120B of the second computing device 100B. Further, the controller 110B (in the second computing device 100B) detects the data file A 350, and moves the data file A 350 from the input directory B 370 to the peer directory B 380. Further, upon determining that the first device 100A had an unexpected restart or is not operating normally, the controller 110B moves the data file A 350 from the peer directory B 380 in memory 120B to the persistent storage 130B, thereby preserving the data file A 350 for later analysis.

In some implementations, the persistent storage 130B may be capable of storing multiple data files at a time. Further, the number of data files that can be stored in the persistent storage 130B may be limited by a maximum number. For example, the persistent storage 130B may be limited to storing the N most recently-received data files, where N is a positive integer greater than one.

Figure 4:
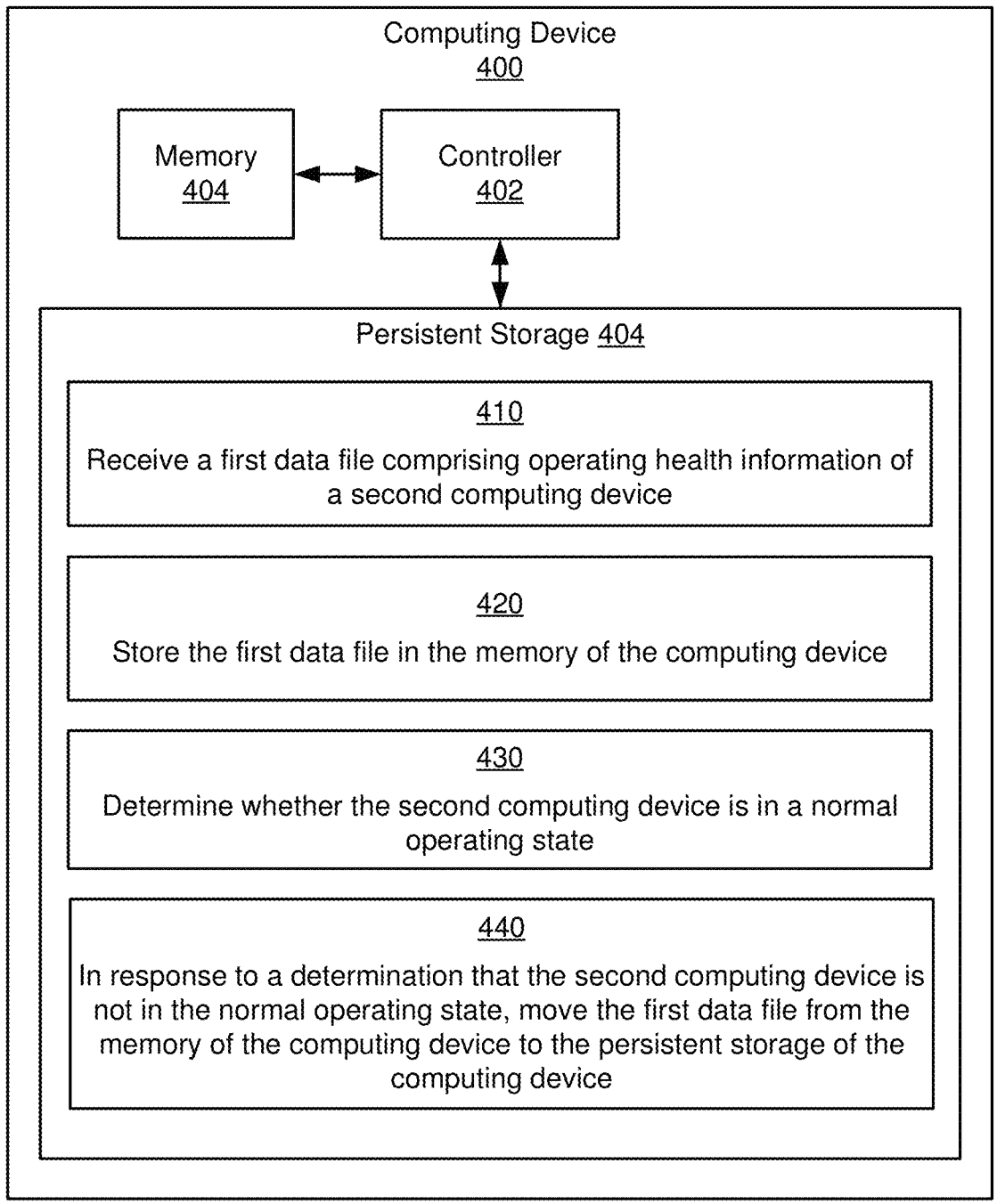
FIG. 4 is a schematic diagram of an example computing device, in accordance with some implementations.

FIG. 4—Example Computing Device

FIG. 4 shows a schematic diagram of an example computing device 400. In some examples, the computing device 400 may correspond generally to one or both of the computing device 100A, 100B (shown in FIGS. 1 and 3A-3D). As shown, the computing device 400 may include a controller 402, memory 404, and persistent storage 405. The persistent storage 405 may be a non-transitory medium (e.g., non-volatile memory). In some implementations, the instructions 410-440 may be stored in the persistent storage 405 (and/or memory 404), and may be executed by the controller 402 (or by a processing engine included in the controller 402). In other implementations, the instructions 410-440 may be implemented in processing circuitry of the controller 402, or in another component included in (or coupled to) the controller 402.

Instruction 410 may be executed to receive a first data file comprising operating health information of a second computing device. Instruction 420 may be executed to store the first data file in the memory of the computing device. For example, referring to FIG. 3B, the controller 110A detects that the data file B 310 is loaded in the input directory A 330 (e.g., by being written or "pushed" by the controller 110B). In response, the controller 110A moves 314 the data file B 310 from the input directory A 330 to the peer directory A 340.

Instruction 430 may be executed to determine whether the second computing device is in a normal operating state. Instruction 440 may be executed to, in response to a determination that the second computing device is not in the normal operating state, move the first data file from the memory of the computing device to the persistent storage of the computing device. For example, referring to FIG. 3C, the controller 110A determines that the second device 100B had an unexpected restart (e.g., has crashed, has restarted itself in response to an error, etc.), and in response moves 316 the data file B 310 from the peer directory A 340 in memory 120A to the persistent storage 130A, thereby preserving the data file B 310 for later use in diagnosing or analyzing the system crash of the second device B.

In another example, referring again to FIG. 3C, the controller 110A analyzes the received data file B 310 to determine the current (or most recent) operating state of the device B. Upon determining (based on the analysis of data file B 310) that the second device 100B is operating in an erroneous or unstable state, the controller 110A sends a restart command 318 to the controller 110B, thereby causing the second device 100B to restart. Further, the controller 110A moves 316 the data file B 310 from the peer directory A 340 in memory 120A to the persistent storage 130A, thereby preserving the data file B 310 for later use in diagnosing or analyzing the erroneous state of the second device B.

Figure 5:
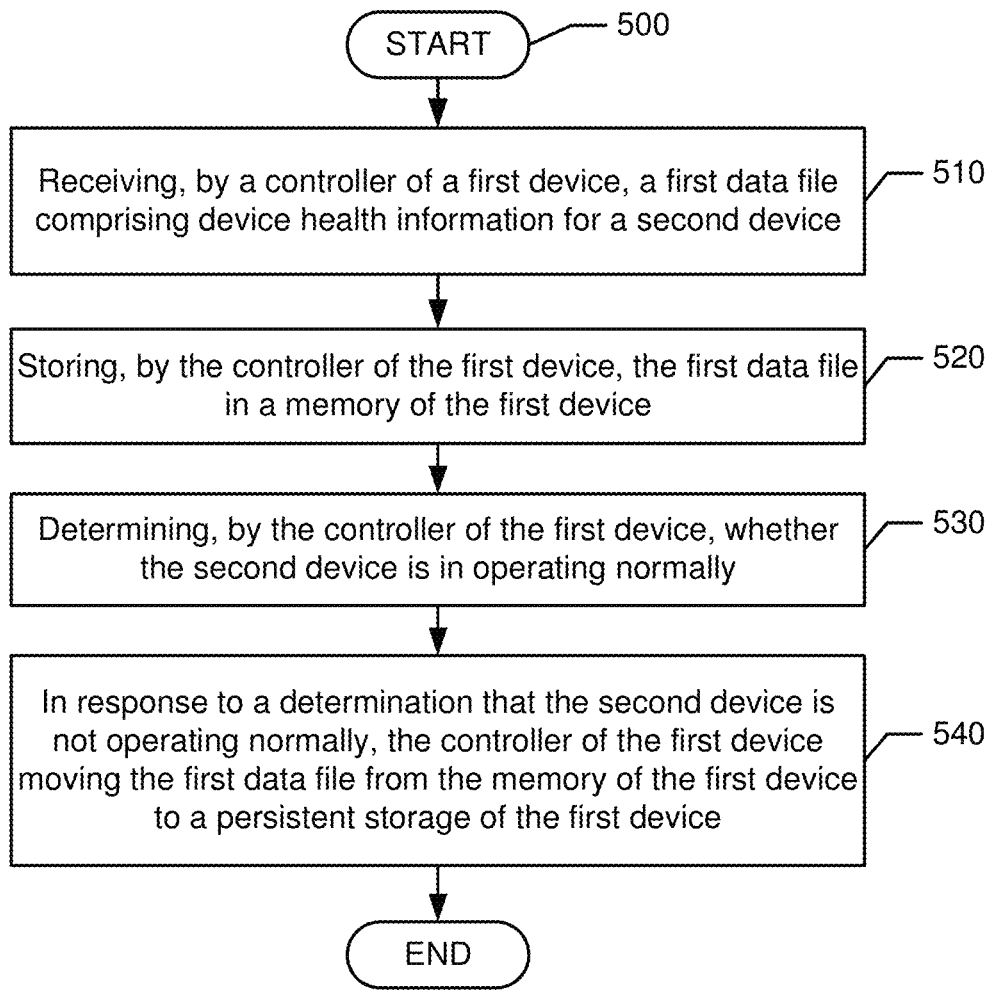
FIG. 5 is an illustration of an example process, in accordance with some implementations.

FIG. 5—Example Process

FIG. 5 shows an example process 500, in accordance with some implementations. In some examples, the process 500 may be performed by a processor or controller (e.g., one or both of the controllers 110A, 110B shown in FIG. 1). The process 500 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. However, other implementations are also possible.

Block 510 may include receiving, by a controller of a first device, a first data file comprising device health information for a second device. Block 520 may include storing, by the controller of the first device, the first data file in a memory of the first device. Block 530 may include determining, by the controller of the first device, whether the second device is in operating normally.

Block 540 may include, in response to a determination that the second device is not operating normally, the controller of the first device moving the first data file from the memory of the first device to a persistent storage of the first device. Blocks 510-540 may correspond generally to the examples described above with reference to instructions 410-440 (shown in FIG. 4).

Figure 6:
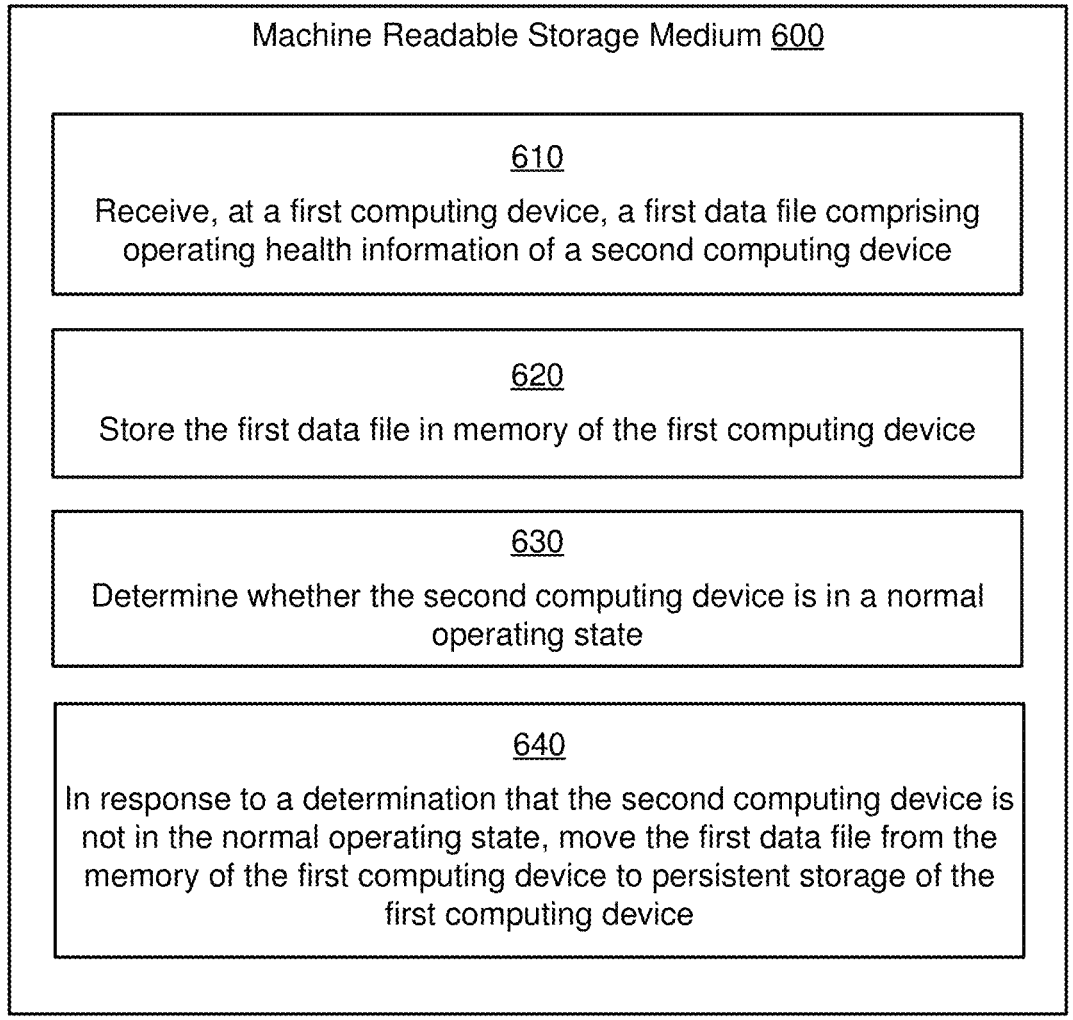
FIG. 6 is a diagram of an example machine-readable medium storing instructions in accordance with some implementations.

FIG. 6—Example Machine-Readable Medium

FIG. 6 shows a machine-readable medium 600 storing instructions 610-640, in accordance with some implementations. The instructions 610-640 can be executed by a controller (e.g., one or both of the controllers 110A, 110B shown in FIG. 1), such as a single processor, multiple processors, a single processing engine, multiple processing engines, and so forth. The machine-readable medium 600 may be a non-transitory storage medium, such as an optical, semiconductor, or magnetic storage medium. The instructions 610-640 may correspond generally to the examples described above with reference to instructions 410-440 (shown in FIG. 4).

Instruction 610 may be executed to receive, at a first computing device, a first data file comprising operating health information of a second computing device. Instruction 620 may be executed to store the first data file in memory of the first computing device.

Instruction 630 may be executed to determine whether the second computing device is in a normal operating state. Instruction 640 may be executed to, in response to a determination that the second computing device is not in the normal operating state, move the first data file from the memory of the first computing device to persistent storage of the first computing device.

CONCLUSION

In accordance with some implementations described herein, a first computing device may be coupled to a second computing device via a network link. The second computing device may generate a health data file, and may send the health data file to a directory in volatile memory of the first computing device. The first computing device may detect the presence of the health data file in the volatile memory, and may analyze the health data file to determine the state of the second computing device.

Upon determining that the second computing device is in an error state, the first computing device may cause a restart of the second computing device. Further, after causing the restart of the second computing device, or upon determining that the second computing device had an unexpected restart, the first computing device may transfer the health data file from the volatile memory to non-volatile memory of the first computing device. As such, the health data file is not lost when the second computing device is shut-down. Further, a health data file that is needed for later analysis (e.g., to diagnose a shut-down) is preserved, without requiring the write of each health data file that is periodically generated by the second computing device. Furthermore, the second computing device may perform a similar process to receive and save the health data files that are generated by the first computing device. In this manner, the number of writes of health data files to non-volatile memory (in both the first and second computing devices) may be reduced, and may therefore increase the usable life of the non-volatile memory.

Note that, while FIGS. 1-6 show various examples, implementations are not limited in this regard. For example, referring to FIG. 1, it is contemplated that the system 105 may include additional devices and/or components, fewer components, different components, different arrangements, and so forth. In another example, it is contemplated that the functionality of the controllers 110A, 110B described above may be included in any another device, component, engine or software. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

What is claimed is:

1. A computing device comprising:
   a controller;
   a memory; and a persistent storage storing instructions, the instructions executable by the processor to:
     receive a first data file comprising operating health information of a second computing device;
     store the first data file in the memory of the computing device;
     determine whether the second computing device is in a normal operating state;
     in response to a determination that the second computing device is not in the normal operating state, move the first data file from the memory of the computing device to the persistent storage of the computing device.

2. The computing device of claim 1, including instructions executable by the controller to:
   perform an analysis of the first data file stored in the memory of the computing device;
   determine that the second computing device is not in the normal operating state based on the analysis of the first data file; and
   in response to the determination that the second computing device is not in the normal operating state based on the analysis of the first data file, cause a restart of the second computing device.

3. The computing device of claim 1, including instructions executable by the controller to:
   detect an unexpected restart of the second computing device; and
   determine that the second computing device is not in the normal operating state in response to detecting the unexpected restart of the second computing device.

4. The computing device of claim 1, including instructions executable by the controller to:
   determine that the first data file has been written into an input directory in the memory of the computing device; and
   in response to determining that the first data file has been written into the input directory, move the first data file from the input directory to a peer directory in the memory of the computing device.

5. The computing device of claim 4, wherein the first data file is generated by the second computing device, and wherein the first data file is pushed to the input directory by the second computing device.

6. The computing device of claim 4, wherein the peer directory stores N health data files that are most recently-received from the second computing device data files, where N is a positive integer greater than one.

7. The computing device of claim 1, including instructions executable by the controller to:
   generate a second data file comprising operating health information for the computing device; and
   store the second data file in the memory of the computing device, wherein the second data file is not stored in the persistent storage of the computing device.

8. The computing device of claim 7, including instructions executable by the controller to:
   push, using a network interface, the second data file to memory of the second computing device, wherein the network interface is included in the computing device.

9. The computing device of claim 1, wherein the operating health information of the second computing device includes one or more of processor metrics, memory metrics, storage usage, listing of active processes, and an event log.

10. A method comprising:
receiving, by a controller of a first device, a first data file comprising device health information for a second device;
storing, by the controller of the first device, the first data file in a memory of the first device;
determining, by the controller of the first device, whether the second device is in operating normally; and
in response to a determination that the second device is not operating normally, the controller of the first device moving the first data file from the memory of the first device to a persistent storage of the first device.

11. The method of claim 10, comprising:
performing, by the controller of the first device, an analysis of the first data file stored in the memory of the first device;
determining, by the controller of the first device, that the second device is not operating normally based on the analysis of the first data file; and
in response to the determination that the second device is not operating normally based on the analysis of the first data file, the controller of the first device causing a restart of the second device.

12. The method of claim 10, comprising:
detecting, by the controller of the first device, an unexpected restart of the second device; and
determining, by the controller of the first device, that the second device is not operating normally in response to detecting the unexpected restart of the second device.

13. The method of claim 10, comprising:
generating, by the controller of the first device, a second data file comprising device health information for the first device; and
storing, by the controller of the first device, the second data file in the memory of the first device, wherein the second data file is not stored in the persistent storage of the first device, and wherein the first and second devices are peer computing devices including in a computing system.

14. The method of claim 13, comprising:
receiving, by a controller of the second device, the second data file from the first device;
storing, by the controller of the second device, the second data file in memory of the second device;
determining, by the controller of the second device, whether the first device is in operating normally; and
in response to a determination that the first device is not operating normally, the controller of the second device moving the second data file from the memory of the second device to persistent storage of the second device.

15. The method of claim 14, comprising:
generating, by the controller of the second device, the first data file; and
storing, by the controller of the second device, the first data file in the memory of the second device, wherein the first data file is not stored in the persistent storage of the second device.

16. A non-transitory machine-readable medium storing instructions that upon execution cause a controller to:
receive, at a first computing device, a first data file comprising operating health information of a second computing device;
store the first data file in memory of the first computing device;
determine whether the second computing device is in a normal operating state; and
in response to a determination that the second computing device is not in the normal operating state, move the first data file from the memory of the first computing device to persistent storage of the first computing device.

17. The non-transitory machine-readable medium of claim 16, including instructions that upon execution cause the controller to:
perform an analysis of the first data file stored in the memory of the first computing device;
determine that the second computing device is not in the normal operating state based on the analysis of the first data file; and
in response to the determination that the second computing device is not in the normal operating state based on the analysis of the first data file, cause a restart of the second computing device.

18. The non-transitory machine-readable medium of claim 16, including instructions that upon execution cause the controller to:
detect an unexpected restart of the second computing device; and
determine that the second computing device is not in the normal operating state in response to detecting the unexpected restart of the second computing device.

19. The non-transitory machine-readable medium of claim 16, including instructions that upon execution cause the controller to:
determine that the first data file has been written into an input directory in the memory of the first computing device; and
in response to determining that the first data file has been written into the input directory, move the first data file from the input directory to a peer directory in the memory of the first computing device.

20. The non-transitory machine-readable medium of claim 16, including instructions that upon execution cause the controller to:
generate a second data file comprising operating health information for the first computing device;
store the second data file in the memory of the first computing device, wherein the second data file is not stored in the persistent storage of the first computing device; and
push, using a network interface, the second data file to memory of the second computing device, wherein the network interface is included in the first computing device.

* * * * *